United States Patent [19]
Wykowski et al.

[11] Patent Number: 4,798,761
[45] Date of Patent: Jan. 17, 1989

[54] EPOXY RESIN COMPOSITIONS FOR USE IN LOW TEMPERATURE CURING APPLICATIONS

[75] Inventors: Paul L. Wykowski; Paul M. Puckett, both of Lake Jackson, Tex.

[73] Assignee: The Dow Chemical Company, Midland, Mich.

[21] Appl. No.: 116,593

[22] Filed: Nov. 3, 1987

[51] Int. Cl.$^4$ .............................................. C08G 63/00
[52] U.S. Cl. .................................. 428/272; 428/273; 428/290; 523/428; 523/434; 525/65; 525/113; 525/122
[58] Field of Search ................ 523/428, 434; 525/113, 525/65, 122; 428/273, 272, 290

[56] References Cited

U.S. PATENT DOCUMENTS

| | | | |
|---|---|---|---|
| 3,496,250 | 2/1970 | Czerwinski | 525/65 |
| 3,855,176 | 12/1974 | Skidmore | 525/113 X |
| 3,894,113 | 7/1985 | Pagel | 525/113 X |
| 3,926,904 | 12/1975 | Scola | 525/113 X |
| 4,082,895 | 4/1978 | Backderf et al. | 525/65 |
| 4,500,660 | 2/1985 | Minamisawa et al. | 523/428 |
| 4,517,038 | 5/1985 | Miller | 156/98 |
| 4,524,181 | 6/1985 | Adam et al. | 525/107 |
| 4,680,076 | 7/1987 | Bart | 156/306.9 |

OTHER PUBLICATIONS

E. S. Caplan, P. M. Puckett, W. D. White; "Second DOD/NASA Composites Repair Technology Workshop", vol. 2, Nov. 4–6, 1986.

P. M. Puckett, W. D. White, P. L. Wykowski and E. S. Caplan; "Development of Low Temperature Curing Resins and Adhesives for Composite Repair, Part I", 19th International SAMPE Technical Conference, Oct. 13–15, 1987, pp. 132–144.

A. J. Klein, "Repair of Composites", *Advanced Composites*, Jul./Aug., 1987, pp. 50–62.

Allowed copending application Ser. No. 664,672; D. K. Hoffman and C. Arends "Stable Dispersions of Polymers in Polyepoxides" Atty. Docket C-31,063-A.

D. J. Crabtree, "Adhesives for Field Repair of Graphite/Epoxy Composite Structures" Report No. NADC-79286-60, Sep. 1981.

L. J. Buckley and R. E. Trabocco; "Epoxy Resin Development for Composite Field Repair"; Naval Air Development Center, Report No. NADC-80128-60; 10-8-89.

Copending application Ser. No. 002,535, Filed 1-12-87; D. E. Henton, C. B. Arends, D. M. Pickelman, V. E. Meyer; "Rubber-Modified Epoxy Compounds".

R. D. Cochran, T. M. Donnellan, R. Trabocco, J. G. Williams; "An Adhesive for Field Repair of Wet Composites" 19th International SAMPE Technical Conference (Closed Session) 10/13-15/87.

"Formulating with Dow Epoxy Resins Adhesives" brochure from The Dow Chemical Company, published 1984.

*Primary Examiner*—Earl Nielsen

[57] ABSTRACT

Compositions comprising a mixture of (A) an epoxy resin composition consisting essentially of (1) at least one epoxy resin which has an average of not more than 2 vicinal epoxy groups per molecule; (2) at least one epoxy resin which has an average of more than 2 vicinal epoxy groups per molecule and (3) at least one rubber or elastomer; and (B) optionally, a low viscosity reactive diluent, are useful in preparing low temperature curable compositions. Also claimed is low temperature curable compositions containing the above components (A) and (B); (C) at least one cycloaliphatic amine hardener and (D) optionally, an accelerator for component (D).

24 Claims, No Drawings

EPOXY RESIN COMPOSITIONS FOR USE IN LOW TEMPERATURE CURING APPLICATIONS

GOVERNMENT CONTRACT INFORMATION

This invention was made with Government support under contract no. F33615-85-C-5081 awarded by the U.S. Air Force. The Government has certain rights in this invention.

FIELD OF THE INVENTION

The present invention pertains to resinous compositions suitable for use in low temperature curing applications including the repair of composite articles.

BACKGROUND OF THE INVENTION

Composites have been employed in the construction of all types of useful articles such as, storage vessels, transportation containers, vehicle parts including cars, trucks, boats and airplanes and the like. These objects, as with all objects, are subject to damage through use. In many instances, these damages will occur at places remote from adequate repair facilities and it is desirable to have means for expedient and often temporary but structurally sound repairs. One method for repairing these composite articles is to adhere, via adhesive bonding, precured composite or metal repair patches to the damaged area(s). Another method is to remove the damaged part and rebuild the part under heat and vacuum in the same manner as the original part was manufactured.

Since these composite objects are employed, for the most part outdoors, they are subjected to all types of environments. In humid environments, the composites tend to absorb moisture. The moisture in wet composites tends to vaporize when subjected to the heat usually involved in curing the patches during their repair, and causes blistering, disbondment and often delamination. It would be desirable to have available an adhesive and or a resinous binder material for use in the repair of the objects prepared from composites which cure below the normal curing temperature of the epoxy resins currently employed in the repair of composite parts or objects. The repair material would most preferably cure below the boiling point of water and produce a polymeric system which has thermal and mechanical properties similar to the composite part being repaired. One method to accomplish this is to have available such adhesive or binder resins which are low temperature curable but yet have sufficient thermal properties, cured strength and water resistance so as to be suitable for use in the repair of the damaged composites.

Low temperature curable epoxy resin systems with good thermal and mechanical properties would also find use in many other applications. Other applications for these resin systems would include uses such as electronic encapsulants, production of electrical laminates, and structural composite parts. The ability to cure epoxy resins at relatively low temperatures would make these materials especially valuable in several composite production techniques like resin transfer molding, braiding, filament winding, pultrusion and similar methods of rapid composite formation.

SUMMARY OF THE INVENTION

One aspect of the present invention pertains to a composition which comprises (A) an epoxy resin composition containing a mixture of
  (1) at least one diglycidyl ether of a compound having 2 aromatic hydroxyl groups per molecule, said diglycidyl ether having an average of not more than 2 vicinal epoxy groups per molecule and an EEW of from about 170 to about 600;
  (2) at least one polyglycidyl ether of a compound having an average of more than two aromatic hydroxyl groups per molecule, said polyglycidyl ether having an EEW of from about 150 to about 350; and
  (3) a rubber or elastomer;
  wherein components (1) and (2) are present in amounts such that from about 20 to about 90 percent of the glycidyl ether groups are derived from component (1) and from about 10 to about 80 percent of the glycidyl ether groups are derived from component (2) and component (3) is present in an amount of from about 2 to about 20 percent by weight based on the combined weight of components (1), (2) and (3); and
(B) optionally, as a reactive diluent to lower the viscosity of the composition, a low viscosity monoglycidyl ether compound or a low viscosity polyglycidyl ether of a compound having two or more aliphatic hydroxyl groups per molecule; and
wherein component (B) is present in an amount of from zero to about 25 percent by weight based on the combined weight of components (A) and (B).

Another aspect of the present invention pertains to a low temperature curable composition which comprises
(A) an epoxy resin composition containing a mixture of
  (1) at least one diglycidyl ether of a compound having 2 aromatic hydroxyl groups per molecule, said diglycidyl ether having an average of not more than 2 vicinal epoxy groups per molecule and an EEW of from about 170 to about 600;
  (2) at least one polyglycidyl ether of a compound having an average of more than two aromatic hydroxyl groups per molecule, said polyglycidyl ether having an EEW of from about 150 to about 350; and
  (3) a rubber or elastomer;
  wherein components (1) and (2) are present in amounts such that from about 20 to about 90 percent of the glycidyl ether groups are derived from component (1) and from about 10 to about 80 percent of the glycidyl ether groups are derived from component (2) and component (3) is present in an amount of from about 2 to about 20 percent by weight based on the combined weight of components (1), (2) and (3);
(B) optionally, as a reactive diluent to lower the viscosity of the composition, a low viscosity monoglycidyl ether compound or a low viscosity polyglycidyl ether of a compound having two or more aliphatic hydroxyl groups per molecule;
(C) at least one cycloaliphatic amine hardener;
(D) optionally, an accelerator for component (C); and
wherein component (B) is employed in a amount of from about zero to about 25 percent by weight based upon the combined weight of components (A) and (B); component (C) is employed in an amount which provides a ratio of equivalents of component (C) per epoxide equivalent of components (A) and (B) combined of from about 0.95:1 to about 1.2:1; and component (D) is employed in an amount of from zero to about 5 percent by weight based upon the combined weight of components (A), (B), and (C) and (D).

A further aspect of the present invention pertains to a laminate or composite article resulting from curing a composition comprising the aforementioned curable composition and at least one reinforcing material.

The present invention provides adhesive or binder resin compositions which are low temperature curable and have sufficient cured strength and water resistance so as to be suitable for use in the repair of damaged composites.

DETAILED DESCRIPTION OF THE INVENTION

Suitable diglycidyl ethers having an average of not more than two vincinal epoxy groups per molecule include, for example, those represented by the following formulas I, II and III zero to about 3, more suitably from zero to about 1.5, most suitably from zero to about 0.5; and $n''$ has an average value suitably from 1 to about 12, more suitably from 1 to about 6, most suitably from 1 to about 3.

The term hydrocarbyl as employed herein means any aliphatic, cycloaliphatic, aromatic, aryl substituted aliphatic or cycloaliphatic, or aliphatic or cycloaliphatic substituted aromatic groups. The term substituted means that the hydrocarbyl group can be substituted with halogen atoms, particularly chlorine or bromine, or nitro groups.

Particularly suitable diglycidyl ethers of compounds having two aromatic hydroxyl groups per molecule which can be employed herein include those diglycidyl ethers of bisphenols such as bisphenol A, bisphenol F, bisphenol K, bisphenol S, dihydroxybiphenyl, as well as

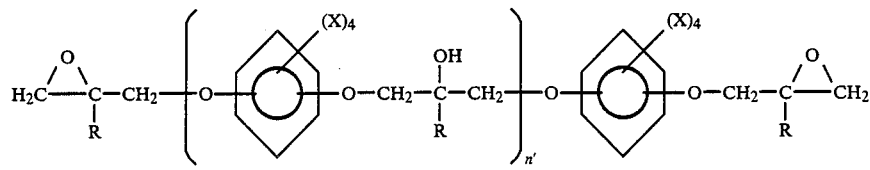

FORMULA I

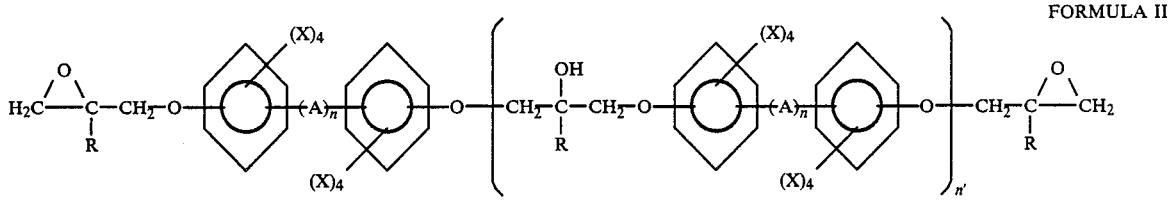

FORMULA II

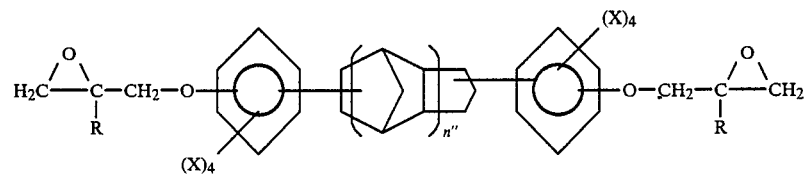

FORMULA III wherein A is a divalent hydrocarbyl group having suitably from 1 to about 12, more suitably from 1 to about 6, most suitably from 1 to about 3, carbon atoms, —O—, —S—, —S—S—, —SO—, —SO$_2$—, —CO— or —O—CO—; each R is independently hydrogen or an alkyl group having from 1 to about 4 carbon atoms; each X is independently hydrogen, a hydrocarbyl group or substituted hydrocarbyl group having suitably from 1 to about 10, more suitably from 1 to about 6, most suitably from 1 to about 3, carbon atoms, a halogen atom, particularly chlorine or bromine, or a nitro group; n has a value of zero to 1; n' has an average value suitably from the halogenated and alkyl derivatives thereof such as chlorine, bromine and alkyl derivatives having from 1 to about 4 carbon atoms. These diglycidyl ethers having an average of not more than two glycidyl ether groups per molecule suitably have an epoxide equivalent weight (EEW) of from about 170 to about 600, more suitably from about 170 to about 360, most suitably from about 170 to about 250.

Suitable epoxy resins having an average of more than two vicinal epoxy groups per molecule include, for example, those represented by the following formulas IV, V and VI

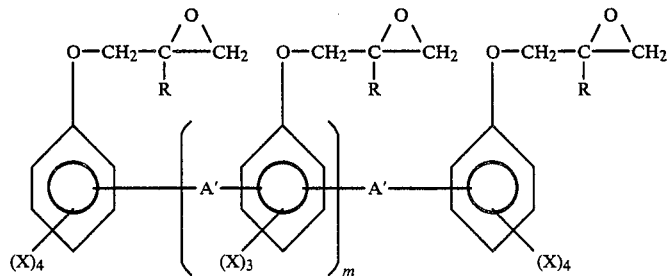

FORMULA IV

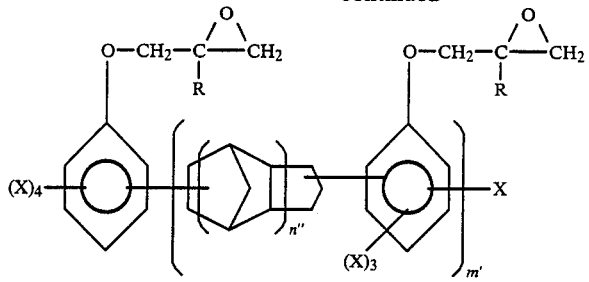

FORMULA V

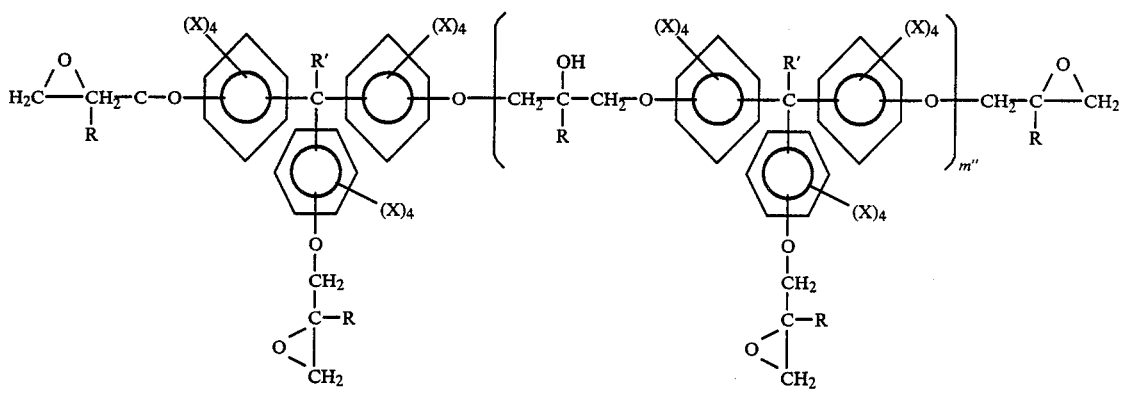

FORMULA VI wherein each R, X and n" are defined above, each A' is independently a divalent hydrocarbyl or substituted hydrocarbyl group having suitably from 1 to about 12, more suitably from 1 to about 6, most suitably from 1 to about 3, carbon atoms; R' is hydrogen or a monovalent hydrocarbyl group or substituted monovalent hydrocarbyl group having suitably from 1 to about 4, more suitably from 1 to about 3, most suitably from 1 to about 2, carbon atoms; m has a value suitably from about 0.01 to about 12, more suitably from about 1 to about 6, most suitably from about 1 to about 3; m' has a value suitably from about 1.01 to about 12, more suitably from about 2 to about 6, most suitably from about 2 to about 3; m" has an average value suitably from about zero to about 10, more suitably from about zero to about 5, most suitably from about zero to about 2.

Particularly suitable polyglycidyl ethers of a novolac resin (formula IV) which can be employed herein include those polyglycidyl ethers of novolac resins prepared by reacting an aldehyde with phenol or substituted phenol. Particularly suitable aldehydes include, for example, formaldehyde, acetaldehyde, butyraldehyde, salicylaldehyde, benzaldehyde or combinations thereof and the like. Particularly suitable phenols include, for example, phenol, cresol, bromophenol, chlorophenol, or combinations thereof and the like. The polyglycidyl ethers of a novolac resin employed herein have an EEW of from about 150 to about 220, more suitably from about 170 to about 190.

Particularly suitable polyglycidyl ethers of an adduct of an ethylenically unsaturated hydrocarbon and a compound containing an aromatic hydroxyl group (formula V) include, for example, adducts of dicyclopentadiene or higher oligomers of cyclopentadiene and phenol, cresol, chlorophenol or bromophenol. These polyglycidyl ethers have an EEW of from about 150 to about 350, more suitably from about 200 to about 300.

The epoxy resins are employed in quantities such that suitably from about 20 to about 90, more suitably from about 50 to about 90, most suitably from about 60 to about 80, percent of the glycidyl ether groups are contributed by component (A-1) and suitably from about 10 to about 80, more suitably from about 10 to about 50, most suitably from about 20 to about 40 percent of the glycidyl ether groups are contributed by component (A-2).

Suitable cycloaliphatic amine hardeners or curing agents which can be employed herein include, for example, those represented by the following formulas VII and VIII

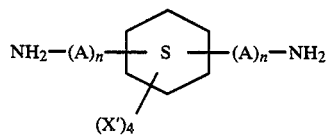

FORMULA VII

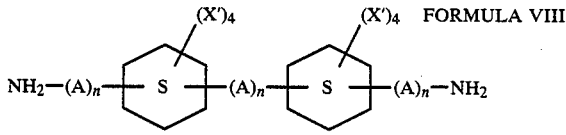

FORMULA VIII wherein each A and n is as defined above and each X' is independently hydrogen or an alkyl group having suitably from 1 to about 12, more suitably from 1 to about 6, most suitably from 1 to about 3, carbon atoms.

Particularly suitable such hardeners or curing agents include, for example, 1,2-diaminocyclohexane, 1,3-diaminocyclohexane, 1,4-diaminocyclohexane, menthane diamine, isophoronediamine, 1,3-di(aminomethyl)cyclohexane, 4,4'-methylenedicyclohexylamine, 3,3'-dimethyl-4,4'-diaminodicyclohexylmethane, combinations thereof and the like.

The cycloaliphatic amine hardener is employed in amounts which provide a ratio of equivalents of hardener (component C) to equivalents of epoxy equivalent contained in components (A) and (B) combined suitably from about 0.95:1 to about 1.2:1, more suitably from about 0.95:1 to about 1.15:1, most suitably from about 1:1 to about 1.15:1.

Suitable rubbers or elastomers employed in the epoxy resin compositions herein can include, for example, carboxyl-containing rubbers or elastomers, copolymers of alkyl acrylates or methacrylates or alkyl esters of other alpha-alkyl substituted ethylenically unsaturated acids, or grafted rubber particles characterized by having a rubbery core and a grafted polymer shell which is compatible with epoxy resins. Particularly suitable rubbers or elastomers are the carboxyl-containing butadiene/acrylonitrile rubbers or elastomers. Other rubbers or elastomers which can be employed similarly include poly(butadiene/acrylonitrile) copolymers which contain terminal or pendant amine groups. These rubbers or elastomers containing secondary amine groups, or carboxyl-containing moieties are commercially available from the B. F. Goodrich Company under the tradename HYCAR.

Particularly suitable rubbers or elastomers which can be similarly employed include polymers formed by polymerizing monomers, such as alkyl acrylate and alkylmethacrylate, in situ in the epoxy resin in the presence of a stabilizer to form a stable dispersed polymer phase according to the methods disclosed by D. K. Hoffman and C. Arends in allowed copending application Ser. No. 664,672 filed Oct. 25, 1984 and also by R. E. Adam et al. in U.S. Pat. No. 4,524,181, both of which are incorporated herein by reference.

Another particularly suitable form of rubber or elastomer for modification of the epoxy resins of the present invention includes those available in the form of a rubber-modified epoxy composition comprising (1) an epoxy resin continuous phase and (2) a stabilized discontinuous phase of grafted rubber particles, which particles have a resin-insoluble rubbery core with a shell which is compatible with the epoxy phase but has latent reactivity with a curing agent. These grafted rubber concentrates (GRC) can be prepared by the methods described by D. E. Henton, C. B. Arends, D. M. Pickelman and V. E. Meyer in copending application Ser. No. 002,535, filed Jan. 12, 1987 which is incorporated herein by reference. Preferred grafted rubber compositions have, as the rubbery core components, conjugated dienes such as butadiene and isoprene, acrylate rubbers such as 2-ethylhexyl acrylate and butyl acrylate rubber and interpolymers. Particularly preferred are cores of crosslinked butadiene rubber. Preferred compounds for the grafted shell are polymers of ethylenically unsaturated compounds such as styrenics, acrylates and methacrylates, acrylonitrile, acrylic and methacrylic acid, vinylized glycidyl ethers such as glycidyl acrylate and methacrylate, combinations thereof and the like. The shell compounds contain a functionality which reacts with functionalities of the epoxy resin continuous phase.

These rubber or elastomer modifiers can be employed in amounts suitably from about 2 to about 20, more suitably from about 2 to about 15, most suitably from about 3 to about 10, percent by weight based upon the total weight of the glycidyl ether compounds and the rubber or elastomer modifiers.

Also, the compositions of the present invention can contain catalysts or accelerators (component (D)) for the curing thereof. Suitable such catalysts or accelerators include, for example, imidazoles, tertiary-amines, tertiary-phosphines, quaternary phosphonium salts, phenolics, combinations thereof and the like. Particularly suitable catalysts or accelerators include, for example, aminoethylpiperazine, 2-methylimidazole, 2-ethyl-4-methylimidazole, 2-phenylimidazole, 2-undecylimidazole, 2-hepta-decylimidazole, 2-ethylimidazole, 2-isopropylimidazole, 2-phenyl-4-methylimidazole, dimethylaminomethyl phenol, tridimethylaminomethyl phenol, N,N-dimethylaniline, tertabutylphosphonium acetate.acetic acid complex benzyldimethylamine, combinations thereof and the like.

The catalyst or accelerators are employed in quantities which provide suitably from about zero to about 5, more suitably from about 0.05 to about 2.5, most suitably from about 0.5 to about 2 percent by weight based upon the combined weight of components (A), (B), (C) and (D).

Suitable monoglycidyl ether compounds which can be employed herein as reactive diluents (component (B)) include, for example, butyl glycidyl ether, phenyl glycidyl ether, epoxidized soybean oil, combinations thereof and the like. Also suitable as reactive diluents are the glycidyl ethers of polyhydroxyl compounds such as, for example, the polyglycidyl ethers of propylene glycol, dipropylene glycol, tripropylene glycol, 1,4-butanediol, neopentylglycol, glycerol, trimethylol propane, copolymers of propylene oxide, ethylene oxide, butylene oxide or mixtures of such oxides, glycerol or trimethylol propane initiated polymers of propylene oxide, ethylene oxide, butylene oxide or a mixture of such oxides, the glycidyl ethers of thiodiglycol, dithiodiglycol, thioether polyols, combinations thereof and the like.

The reactive diluents are employed in amounts suitably from zero to about 25, more suitably from about 2 to about 25, most suitably from about 5 to about 15, percent by weight based upon the combined weight of components (A) and (B).

The compositions of the present invention can also, if desired, contain reinforcing materials in the form of mats, woven fabric, unidirectional fibers, rovings, random fibers or filaments, inorganic fillers, inorganic whiskers, hollow spheres, ceramics, and the like. These reinforcing materials can be prepared from glass fibers, aramid fibers, graphite fibers, and polymer fibers such as nylon, polyalkylene terephthalate, polyethylene, polypropylene, polyesters, combinations thereof and the like.

If desired, other components can be included in the compositions of the present invention, such as, for example, pigments, dyes, fillers, wetting agents, stabilizers, mold release agents, flow control agents, fire retardant agents, surfactants, combinations thereof and the like. These components are included in amounts which are effective for their purpose, e.g. pigments and dyes are employed in amounts sufficient to color the composition to the extent desired and wetting agents are employed in amounts sufficient to wet out any reinforcing materials present in the compositions.

These additives are added in functionally equivalent amounts e.g. the pigments and/or dyes are added in quantities which will provide the composition with the desired color; however, they are suitably employed in amounts of from about zero to about 20, more suitably from about 0.05 to about 5, most suitably from about 0.5 to about 3 percent by weight based upon the weight of total blended composition.

Fillers are employed in amounts which will provide the composition with the desired consistency; however, they are suitably employed in amounts of from about zero to about 95, more suitably from about 10 to about 80, most suitably from about 40 to about 60 percent by weight based upon the weight of total composition.

The following examples are illustrative of the invention, but are not to be construed as to limiting the scope thereof in any manner.

The following epoxy resins are employed in the examples.

Epoxy Resin A is a diglycidyl ether of bisphenol A having an epoxide equivalent weight (EEW) of 176.

Epoxy Resin B is a hydrocarbon epoxy novolac resin prepared from dicyclopentadiene and phenol having an EEW of 253 and an average functionality of 3.2.

Epoxy Resin C is a phenol-formaldehyde epoxy novolac resin having an EEW of 181 and an average functionality of 3.6.

Rubber Modifier A is a copolymer rubber of 2-ethylhexylacrylate dispersed in the epoxy resin mixture.

Catalyst or Accelerator A is 2-ethyl-4-methylimidazole added in an amount based on the total weight of the epoxy resin blend and curing agent.

EXAMPLES

A sample of the epoxy resin(s) is warmed to 60° C., if necessary, to make it pourable. The sample is weighed (±0.01 g) by pouring into a glass container. When a mixture of epoxy resins is employed, the glass container, after sealing, is placed in a shaker bath under gentle heating until a homogeneous solution is obtained. Approximately 0.4 g (±0.1 mg) of the resultant solution is weighed into a glass container and dissolved in 15 ml of methylene chloride. A 15 ml aliquot of 1N tetraethylammonium bromide in acetic acid is added to the dissolved resin along with 4 drops of crystal violet indicator. The sample is then titrated to a green end point against standardized 0.1N perchloric acid in glacial acetic acid. Based on the measured equivalent weight of the above resin or resin mixture, the resin or resin mixture is thoroughly mixed with a 10% stoichiometric excess of diaminocyclohexane as a hardener (curing agent).

A mixture of the epoxy resin, cycloaliphatic amine hardener, and catalyst is mixed together at a temperature between 25° C. to 45° C. After thorough mixing the mixture is degassed by evacuating the mixture to a pressure of 1 torr (atmosphere). The resultant degassed mixture is then poured into each of two molds consisting of two 13 in.×13 in.×0.125 in. (330 mm×330 mm×3.175 mm) polished aluminum plates separated by 0.125 in. (3.175 mm) spacers and a silicone rubber gasket. The cast mixtures are allowed to cure at 90° C. for 250 minutes after which one of the resultant cured, cast sheets is demolded. The second casting is further cured for 120 minutes at 177° C. After cooling, the cured resins are prepared for testing by the following methods: ASTM D-638 (tensile); ASTM D-790 (flexural) and ASTM D-648 (heat distortion temperature, HDT).

Water absorption is determined from specimens of 1 in.×3 in. (25.4 mm×76.2 mm) coupons of the above mentioned castings. The edges of the coupons are sanded successively with 320, 400 and 600 grit emery cloth. The specimens are dried at 90° C. overnight and cooled for 2 hours in a desiccator. The samples are weighed and then immersed in boiling water. The samples are removed, dried and weighed at intervals during the test. The final weighing is performed after 168 hours.

Barcol Hardness is determined from a Barber-Coleman Impressor model GTZJ 934-1 and is expressed as the average of 10 measurements.

The glass transition temperature (Tg) is determined by thermomechanical analysis (TMA) on a DuPont instrument model 1090 series 4 thermal analysis instrument.

The viscosity of the resin or resin mixture is determined by a Brookfield model DV-II cone and plate viscometer at 25° C. with a no. 41 spindle. Viscosities of the resin or resin mixture with and without hardener (curing agent) is measured. After the four hour period, the castings are removed from the oven and glass transition temperatures are measured by differential scanning calorimetry (DSC) and thermomechanical analysis (TMA). The residual energy of curing is also measured by DSC.

The resins and resin mixtures and results of the experiments are given in Table I.

TABLE I

| Components and Properties | Expt. A* | Expt. B* | Expt. C* | Expt. D* | Expt. E | Expt. F | Expt. G | Expt. H |
|---|---|---|---|---|---|---|---|---|
| Resin A wt % | 100 | 100 | 70 | 70 | 65 | 65 | 65 | 65 |
| Resin B wt % | — | — | — | — | — | — | 30 | 30 |
| Resin C wt % | — | — | 30 | 30 | 30 | 30 | — | — |
| Rubber wt % | — | — | — | — | 5 | 5 | 5 | 5 |
| Resin mass, g | 272.98 | 272.99 | 253.86 | 251.39 | 275.57 | 275.58 | 279.52 | 279.53 |
| Hardener mass, g | 48.79 | 48.79 | 46.17 | 45.73 | 46.23 | 46.23 | 42.25 | 42.26 |
| Catalyst Mass, g | 3.3 | 3.29 | 3.06 | 3.02 | 3.25 | 3.25 | 3.25 | 3.25 |
| Viscosity of Mixture, cps @ 25° C. | 233 | — | 880 | — | — | — | — | — |
| Curing Cond. °C./min | 90/252 | 90/252 | 90/254 | 90/249 | 90/250 | 90/250 | 90/255 | 90/255 |
| Post-Cure Cond. °C./min | — | 177/128 | — | 177/132 | — | 177/129 | — | 177/130 |
| Tensile kpsi Strength mPa | 12.4 85.5 | 8.1 55.8 | 10.6 73.1 | 8.1 55.8 | 11.6 79.8 | 10.3 71 | 11.6 80 | 11.3 77.9 |
| Tensile kpsi Modulus GPa | 434 2.99 | 397 2.74 | 441 3.04 | 448 3.09 | 407 2.81 | 382 2.63 | 415 2.86 | 384 2.65 |
| % Elongation | 6.6 | 2.6 | 3.7 | 2.3 | 5.0 | 4.7 | 5.8 | 6.3 |
| Flexural kpsi Strength kPa | 22.6 155.8 | 18.7 128.9 | 22.2 153.1 | 20.6 142 | 20.6 142 | 18.8 129.6 | 19.9 137.2 | 19.7 135.8 |
| Flexural kpsi Modulus GPa | 460 3.1 | 441 3.04 | 509 3.51 | 467 3.22 | 458 3.16 | 423 2.92 | 462 3.19 | 413 2.8 |

TABLE I-continued

| Components and Properties | Expt. A* | Expt. B* | Expt. C* | Expt. D* | Expt. E | Expt. F | Expt. G | Expt. H |
|---|---|---|---|---|---|---|---|---|
| Barcol Hardness | 39 | 38 | 42 | 44 | 25 | 29 | 23 | 25 |
| % Water Absorption | 3.227 | 3.062 | 3.2 | 3.184 | 3.444 | 3.060 | 3.044 | 2.542 |
| Heat Distortion Temp. (264 psi Load), °C. | 124 | 132 | 118 | 140 | 118 | 141 | 119 | 145 |
| Tg (°C.) by TMA | 104–110 | 143–151 | 108–109 | 141–142 | 103–104 | 165–171 | 120–126 | 157–164 |

*Not an example of the present invention.

What is claimed is:

1. A composition which comprises
(A) an epoxy resin composition containing, as the only epoxy-containing component in said composition, a mixture of
   (1) at least one diglycidyl ether of a compound having 2 aromatic hydroxyl groups per molecule, said diglycidyl ether having an average of not more than 2 vicinal epoxy groups per molecule and an EEW of from about 170 to about 600;
   (2) at least one polyglycidyl ether of a compound having an average of more than two aromatic hydroxyl groups per molecule, said polyglycidyl ether having an EEW of from about 150 to about 350; and
   (3) a rubber or elastomer;
   wherein components (1) and (2) are employed in amounts such that from about 20 to about 90 percent of the glycidyl ether groups are derived from component (1) and from about 10 to about 80 percent of the glycidyl ether groups are derived from component (2) and component (3) is employed in an amount of from about 2 to about 20 percent by weight based on the combined weight of components (1), (2) and (3); and
(B) optionally, as a reactive diluent to lower the viscosity of the composition, a low viscosity monoglycidyl ether compound or a low viscosity polyglycidyl ether of a compound having two or more aliphatic hydroxyl groups per molecule; and
wherein component (B) is employed in an amount of from zero to about 25 percent by weight based on the combined weight of components (A) and (B).

2. A composition of claim 1 wherein components (A-1) and (A-2) are employed in amounts such that from about 50 to about 90 percent of the glycidyl ether groups are derived from component (A-1) and from about 10 to about 50 percent of the glycidyl ether groups are derived from component (A-2); component (A-3) is employed in an amount of from about 2 to about 15 percent by weight of the combined weight of components (A-1), (A-2) and (A-3); component (B) is employed in an amount of from about 2 to about 25 percent by weight based on the weight of components (A) and (B).

3. A composition of claim 2 wherein components (A-1) and (A-2) are employed in amounts such that from about 60 to about 80 percent of the glycidyl ether groups are derived from component (A-1) and from about 20 to about 40 percent of the glycidyl ether groups are derived from component (A-2); component (A-3) is employed in an amount of from about 3 to about 10 percent by weight of the combined weight of components (A-1), (A-2) and (A-3); component (B) is employed in an amount of from about 5 to about 15 percent by weight based on the weight of components (A) and (B).

4. A composition of claim 1, 2 or 3 wherein
(a) component (A-1) is an epoxy resin or mixture of epoxy resins represented by the following formulas I, II or III

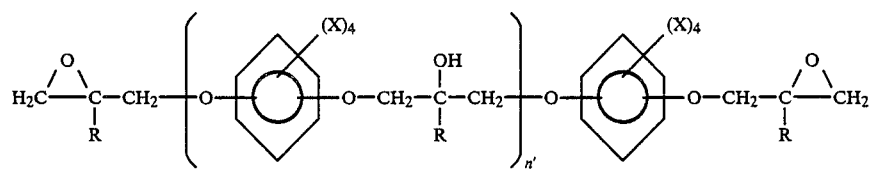

FORMULA I

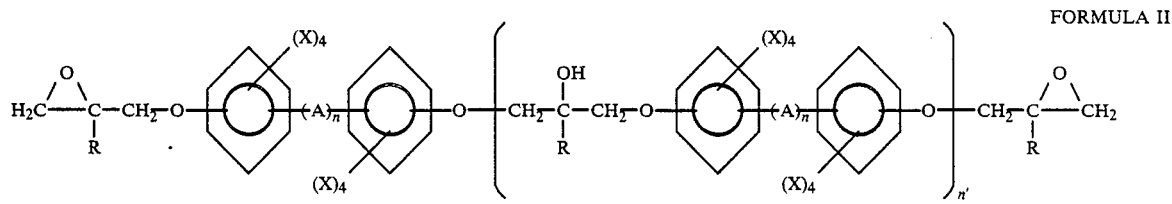

FORMULA II

-continued

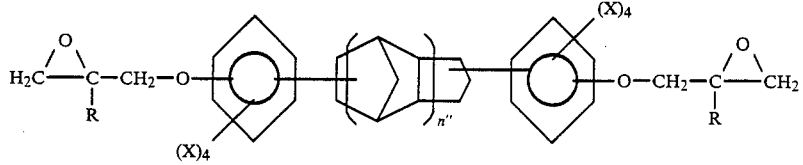
FORMULA III wherein A is a divalent hydrocarbyl group having from 1 to about 6 carbon atoms, —O—, —S—, —S—S—, —SO—, —SO$_2$—, —CO— or —O—CO—; each R is independently hydrogen or an alkyl group having from 1 to about 4 carbon atoms; each X is independently hydrogen, a hydrocarbyl group or substituted hydrocarbyl group having from 1 to about 10 carbon atoms, a halogen atom, or a nitro group, n has a value of zero or 1; and n' has an average value from zero to about 3; n" has an average value from 1 to about 12;

(b) component (A-2) is an epoxy resin or mixture of epoxy resins represented by the following formulas IV, V or VI hydrocarbyl group having from 1 to about 4 carbon atoms; m has a value from about 0.01 to about 12; m' has a value from about 1.01 to about 12; and m" has a value from zero to about 10;.

5. A composition of claim 4 wherein
(a) component (A-1) is an epoxy resin or mixture of epoxy resins represented by formula II wherein A is a divalent hydrocarbyl group having from 1 to about 6 carbon atoms; each R is hydrogen; each X is independently hydrogen, a hydrocarbyl group having from 1 to about 6 carbon atoms or a halogen atom; n has a value of 1; n' has an average value from zero to about 1.5; and
(b) component (A-2) is an epoxy resin or mixture of

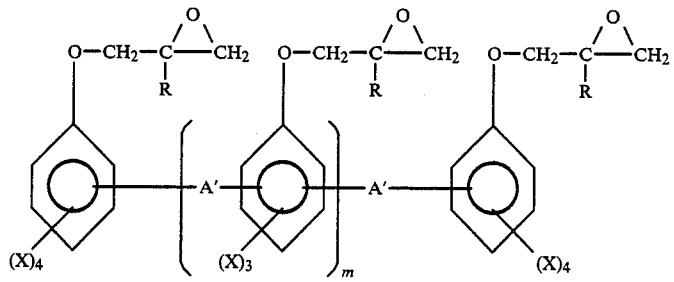
FORMULA IV

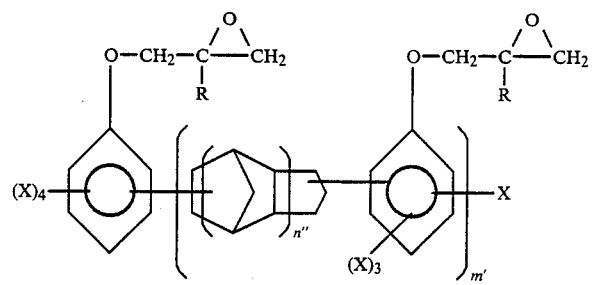
FORMULA V

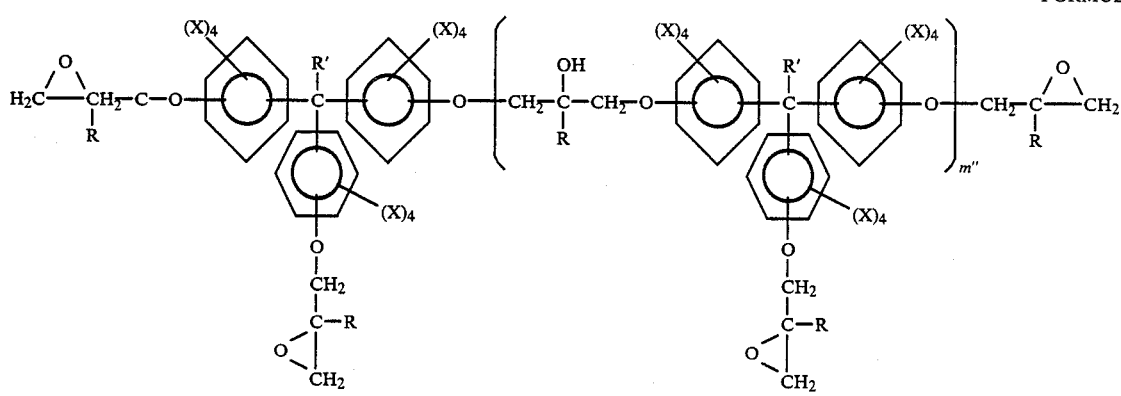
FORMULA VI wherein each R, X and n" are as previously defined; each A' is independently a divalent hydrocarbyl or substituted hydrocarbyl group having from 1 to about 12 carbon atoms; R' is hydrogen or a monovalent hydrocarbyl group or substituted monovalent epoxy resins represented by formulas IV or B wherein R and X are as defined in (a); n" has an average value of from about 1 to about 6; each A' is a methylene group; m has an average value from 1 to about 6 and m' has an average value from about 2 to about 6.

6. A composition of claim 5 wherein
(a) in component (A-1), A is a divalent hydrocarbyl group having from 1 to about 3 carbon atoms; each X is independently hydrogen or a hydrocarbyl group having from 1 to about 3 carbon atoms; and n' has a value from zero to about 0.5;
(b) in component (A-2), n'' has an average value of from about 1 to about 3; m has an average value from about 1 to about 3; m' has an average value from about 2 to about 3; and
(c) the rubber or elastomer, component (A-3), is poly(2-ethylhexylacrylate) copolymer rubber, grafted rubber particles or combinations thereof.

7. A composition of claim 6 wherein
(a) component (A-1) is a diglycidyl ether of bisphenol A; and
(b) component (A-2) is a phenol-formaldehyde or a cresol-formaldehyde epoxy novolac resin or a polyglycidyl ether of an adduct of dicyclopentadiene and phenol or cresol.

8. A low temperature curable composition which comprises
(A) an epoxy resin composition containing, as the only epoxy-containing component in said composition, a mixture of
  (1) at least one diglycidyl ether of a compound having 2 aromatic hydroxyl groups per molecule, said diglycidyl ether having an average of not more than 2 vicinal epoxy groups per molecule and an EEW of from about 170 to about 600;
  (2) at least one polyglycidyl ether of a compound having an average of more than two aromatic hydroxyl groups per molecule, said polyglycidyl ether having an EEW of from about 150 to about 350; and
  (3) a rubber or elastomer;
  wherein components (1) and (2) are employed in amounts such that from about 20 to about 90 percent of the glycidyl ether groups are derived from component (1) and from about 10 to about 80 percent of the glycidyl ether groups are derived from component (2) and component (3) is employed in an amount of from 2 to about 20 percent by weight based on the combined weight of components (1), (2) and (3);
(B) optionally, as a reactive diluent to lower the viscosity of the composition, a low viscosity monoglycidyl ether compound or a low viscosity polyglycidyl ether of a compound having two or more aliphatic hydroxyl groups per molecule;
(C) at least one cycloaliphatic amine hardener;
(D) optionally, an accelerator for component (C); and
  wherein component (B) is employed in an amount of from about zero to about 25 percent by weight based upon the combined weight of components (A) and (B); component (C) is employed in an amount which provides a ratio of equivalents of component (C) per epoxide equivalent of components (A) and (B) combined of from about 0.95:1 to about 1.2:1; and component (D) is employed in an amount of from zero to about 5 percent by weight based upon the combined weight of components (A), (B), (C) and (D).

9. A low temperature curable composition of claim 8 wherein components (A-1) and (A-2) are employed in amounts such that from about 50 to about 90 percent of the glycidyl ether groups are derived from component (A-1) and from about 10 to about 50 percent of the glycidyl ether groups are derived from component (A-2); component (A-3) is employed in an amount of from about 2 to about 15 percent by weight of the combined weight of components (A-1), (A-2) and (A-3); component (B) is employed in an amount of from about 2 to about 25 percent by weight based on the weight of components (A) and (B); component (C) is employed in amounts which provide a ratio of equivalents of component (C) per epoxide equivalent of components (A) and (B) combined of from about 0.95:1 to about 1.15:1; and component (D) is employed in an amount of from about 0.05 to about 2.5 percent by weight based upon the combined weight of components (A), (B), (C) and (D).

10. A low temperature curable composition of claim 9 wherein components (A-1) and (A-2) are employed in amounts such that from about 60 to about 80 percent of the glycidyl ether groups are derived from component (A-1) and from about 20 to about 40 percent of the glycidyl ether groups are derived from component (A-2); component (A-3) is employed in an amount of from about 3 to about 10 percent by weight of the combined weight of components (A-1), (A-2) and (A-3); component (B) is employed in an amount of from about 5 to about 15 percent by weight based on the weight of components (A) and (B); component (C) is employed in an amount which provides a ratio of equivalents of component (C) per epoxide equivalent of components (A) and (B) combined of from about 1:1 to about 1.15:1; and component (D) is employed in an amount of from about 0.5 to about 2 percent by weight based upon the combined weight of components (A), (B), (C) and (D).

11. A low temperature curable composition of claim 8, 9 or 10 wherein
(a) component (A-1) is an epoxy resin or mixture of epoxy resins represented by the following formulas I, II or III

FORMULA I

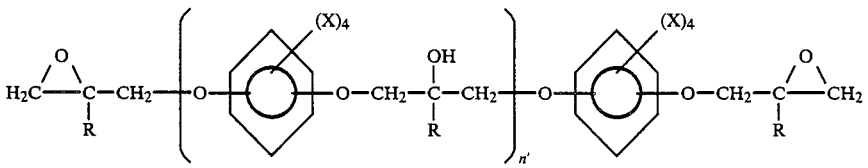

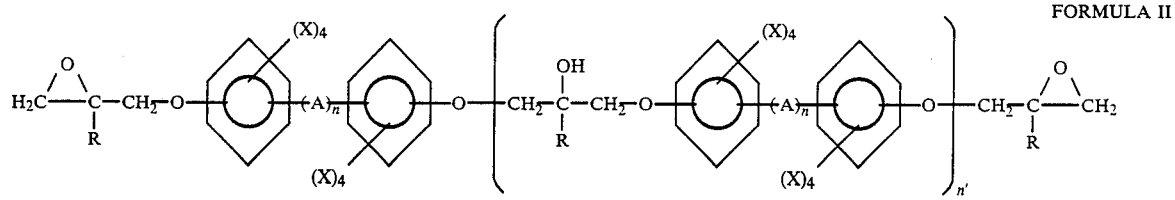

FORMULA II

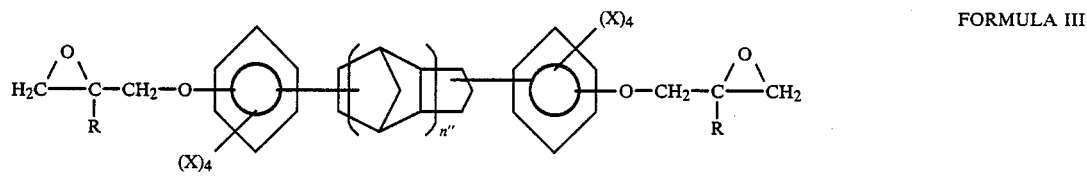

FORMULA III wherein A is a divalent hydrocarbyl group having from 1 to about 6 carbon atoms, —O—, —S—, —S—S—, —SO—, —SO₂—, —CO— or —O—CO—; each R is independently hydrogen or an alkyl group having from 1 to about 4 carbon atoms; each X is independently hydrogen, a hydrocarbyl group or substituted hydrocarbyl group having from 1 to about 6 carbon atoms, a halogen atom, or a nitro group; n has a value of zero or 1; and n' has an average value from zero to about 1.5; n" has an average value from 1 to about 6;

(b) component (A-2) is an epoxy resin or mixture of epoxy resins represented by the following formulas IV, V or VI

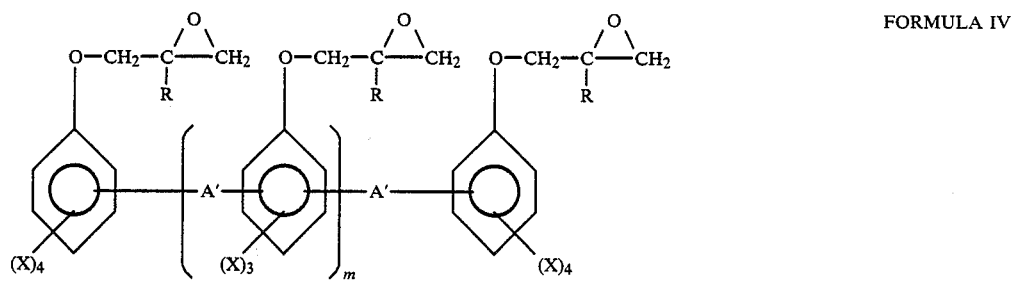

FORMULA IV

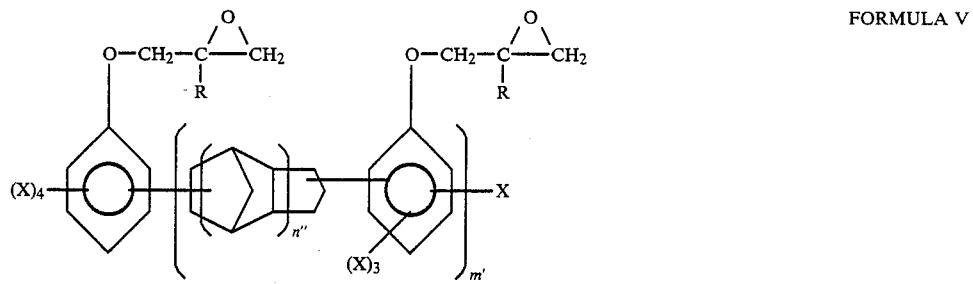

FORMULA V

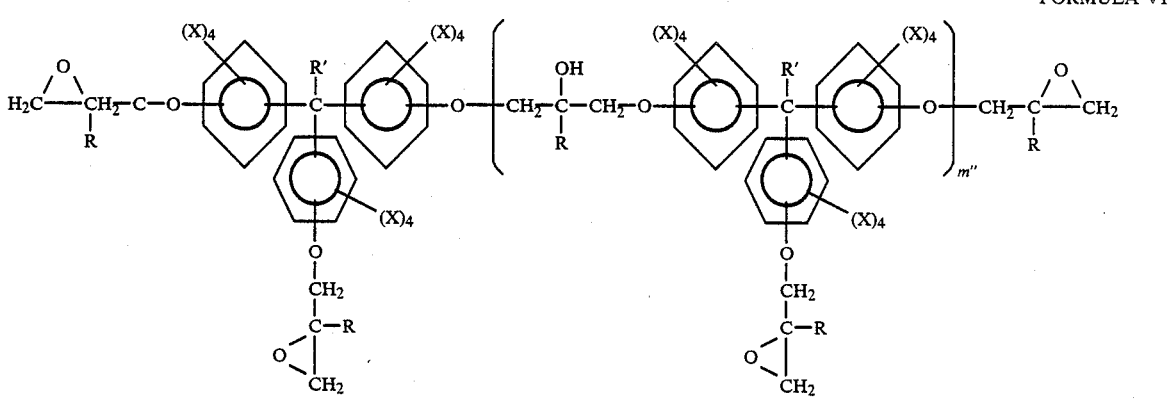

FORMULA VI wherein A is a divalent hydrocarbyl group having from 1 to about 6 carbon atoms, —O—, —S—, —S—S—, —SO—, —SO₂—, —CO— or —O—CO—; each R is independently hydrogen or an alkyl group having from 1 to about 4 carbon atoms; each X is independently hydrogen, a hydrocarbyl group or substituted hydrocarbyl group having from 1 to about 10 carbon atoms, a halogen atom, or a nitro group; n has a value of zero or 1; and n' has an average value from zero to about 3; n'' has an average value from 1 to about 12; and (c) component (C) is a curing agent or mixture of curing agents represented by the following formulas VII or VIII

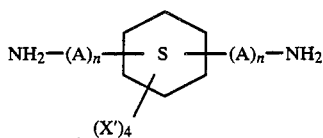

FORMULA VII

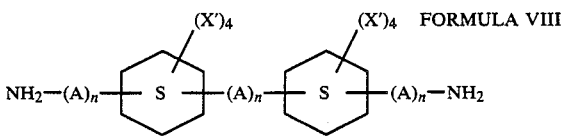

FORMULA VIII wherein each A and n is as defined above and each X' is independently hydrogen or an alkyl group having suitably from 1 to about 12, more suitably from 1 to about 6, most suitably from 1 to about 3, carbon atoms.

12. A low temperature curable composition of claim 11 wherein (a) component (A-1) is an epoxy resin or mixture of epoxy resins represented by formula II wherein A is a divalent hydrocarbyl group having from 1 to about 6 carbon atoms; each R is hydrogen; each X is independently hydrogen, a hydrocarbyl group having from 1 to about 6 carbon atoms or a halogen atom; n has a value of 1; n' has an average value from zero to about 1.5;

(b) component (A-2) is an epoxy resin or mixture of epoxy resins represented by formulas IV or V wherein R and X are as defined in (a); n'' has an average value of from about 1 to about 6; each A' is a methylene group; m has an average value from 1 to about 6 and m' has an average value from about 2 to about 6; and (c) component (C) is a curing agent or mixture of curing agents represented by formulas VII or VIII wherein A is —CH$_2$—; n has a value of xero or 1; and each X' is independently hydrogen or an alkyl group having from 1 to about 3 carbon atoms.

13. A low temperature curable composition of claim 12 wherein (a) in component (A-1), A is a divalent hydrocarbyl group having from 1 to about 3 carbon atoms; each X is independently hydrogen or a hydrocarbyl group having from 1 to about 3 carbon atoms; and n' has a value from zero to about 0.5;

(b) in component (A-2), n'' has an average value of from about 1 to about 3; m has an average value from about 1 to about 3; m' has an average value from about 2 to about 3;

(c) the rubber or elastomer, component (A-3), is poly(2-ethylhexylacrylate) copolymer rubber, grafted rubber particles or combinations thereof; and (d) component (C) is a compound represented by formula VII.

14. A low temperature curable composition of claim 13 wherein (a) component (A-1) is a diglycidyl ether of bisphenol A;

(b) component (A-2) is a phenol-formaldehyde or a cresol-formaldehyde epoxy novolac resin or a polyglycidyl ether of an adduct of dicyclopentadiene and phenol or cresol; and (c) the rubber or elastomer, component (A-3), is poly(2-ethylhexylacrylate) copolymer rubber;

(d) component (C) is diaminocyclohexane; and (e) the catalyst or accelerator is 2-ethyl-4-methylimidazole.

15. An article resulting from curing the composition of claim 8, 9 or 10 which also contains a reinforcing agent.

16. An article of claim 15 wherein the reinforcing agent is glass, aramid or graphite in woven, mat or roving form.

17. An article resulting from curing the composition of claim 11 which also contains a reinforcing agent.

18. An article of claim 17 wherein the reinforcing agent is glass, aramid or graphite in woven, mat or roving form.

19. An article resulting from curing the composition of claim 12 which also contains a reinforcing agent.

20. An article of claim 19 wherein the reinforcing agent is glass, aramid or graphite in woven, mat or roving form.

21. An article resulting from curing the composition of claim 13 which also contains a reinforcing agent.

22. An article of claim 21 wherein the reinforcing agent is glass, aramid or graphite in woven, mat or roving form.

23. An article resulting from curing the composition of claim 14 which also contains a reinforcing agent.

24. An article of claim 23 wherein the reinforcing agent is glass, aramid or graphite in woven, mat or roving form.

* * * * *

UNITED STATES PATENT AND TRADEMARK OFFICE
CERTIFICATE OF CORRECTION

PATENT NO. : 4,798,761

DATED : January 17, 1989

INVENTOR(S) : Paul L. Wykowski and Paul M. Puckett

It is certified that error appears in the above-identified patent and that said Letters Patent is hereby corrected as shown below:

Column 3, line 54, change "to" to --or--.

Column 5, line 30, insert --as-- after "are".

Column 14, line 66, Claim 5; change "B" to --V--.

Signed and Sealed this

Twenty-sixth Day of June, 1990

*Attest:*

HARRY F. MANBECK, JR.

*Attesting Officer*   *Commissioner of Patents and Trademarks*